United States Patent [19]
Martin

[11] 3,817,476
[45] June 18, 1974

[54] SELF-STEERING CARRIER FOR VARIOUS CONVEYOR SYSTEMS

[75] Inventor: Rene Jean Martin, Villeneuve-La-Garenne, France

[73] Assignee: Societe Francaise de Tubes Pneumatiques, Levallois-Perret, France

[22] Filed: Oct. 2, 1972

[21] Appl. No.: 293,945

[30] Foreign Application Priority Data
Oct. 1, 1971    France .............................. 71.35462

[52] U.S. Cl. ................................ 243/16 R, 243/36
[51] Int. Cl. ............................................ B65g 51/40
[58] Field of Search .......... 243/16 R, 16 M, 36, 38, 243/39; 198/38; 104/88; 246/2 R

[56] References Cited
UNITED STATES PATENTS

| | | | |
|---|---|---|---|
| 2,508,086 | 5/1950 | Alvarez | 198/38 |
| 2,673,292 | 3/1954 | Treharne | 246/2 R X |
| 3,117,743 | 1/1964 | Todt et al. | 243/16 R X |

*Primary Examiner*—Evon C. Blunk
*Assistant Examiner*—James L. Rowland

[57] ABSTRACT

This carrier or container for conveyor systems, notably for pneumatic dispatch systems by tubular lines, comprises at least two conducting lateral strips, resistors inserted between one of said strips and the other strip through one or a plurality of said resistors, switch means for presetting or indexing the resistance value through said carrier, whereby, when said carrier travels past a suitable reading device comprising notably a Wheatstone bridge, the carrier can be switched to selectively follow any predetermined one among a plurality of routes. (FIG. 3)

4 Claims, 5 Drawing Figures

PATENTED JUN 18 1974 3,817,476
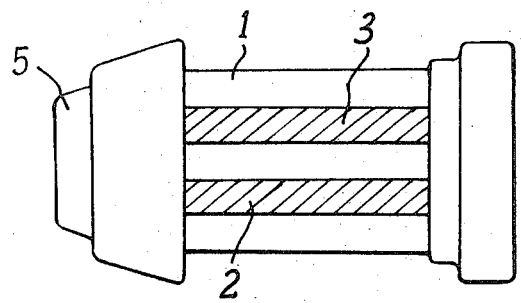
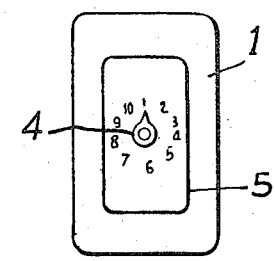
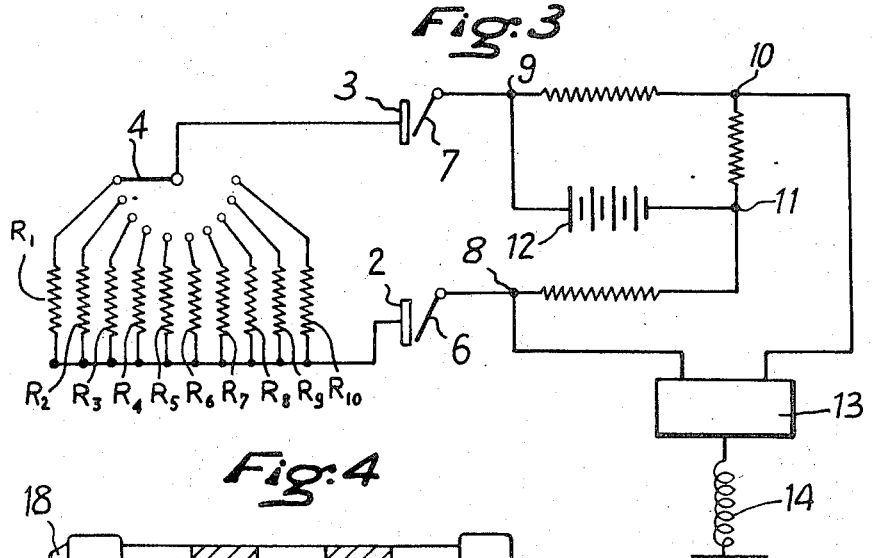
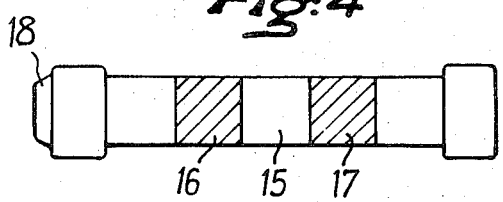
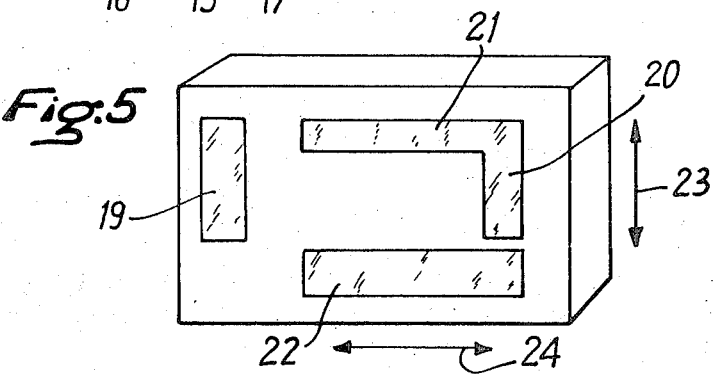

3,817,476

SELF-STEERING CARRIER FOR VARIOUS CONVEYOR SYSTEMS

BACKGROUND OF THE INVENTION

1. Field of the Invention

This invention relates to self-steering carriers or containers for conveyor systems such as endless belt conveyors, pater-noster bead type conveyors, chain conveyors, pneumatic tube dispatch systems and other known and equivalent systems, and its essential object is to permit the automatic reading of the intended destination of the carrier or container along a relatively long surface thereof for ensuring a high degree of reading reliability irrespective of the number of destinations to be utilized.

2. Description of the Prior Art

Systems of transporting written messages or documents through long tubes of small diameter are already known; their purpose is to provide an automatic communication network between more than 20 stations to and from an automatic central exchange station adapted to receive the carriers travelling in incoming lines and to return the carriers in outgoing lines, along which the various stations of the system, utilizing self-steering or switching carriers or cartridges comprising means for indexing on these carriers the address of the receiving station are disposed, said means co-acting in the system with reading devices controlling automatically the line switches for directing the carriers according to the indexed address.

As a rule, the indexing means are associated with means for determining in the carrier body a variable surface corresponding to the address of the receiving station, the position of this surface in relation to a reference surface being picked up by each reading device of the network. However, it is clear that when the system comprises a relatively great number of stations, the surface available for each address becomes very small and consequently the "flying" reading thereof, i.e., without stopping the carrier, becomes rather unreliable.

SUMMARY OF THE INVENTION

It is the essential object of the present invention to provide a self-steering carrier or container and reading means associated therewith, whereby the reading applies to a number of carrier surfaces which is very small in comparison with the number of addressee stations, or intended destinations, so that these surfaces can be relatively extensive in order to ensure a highly reliable reading efficiency.

According to this invention, the body of each self-steering carrier or container comprises at least two conducting surfaces adapted to engage corresponding pickup brushes associated with resistance measuring devices disposed along the lines of the conveyor system, said conducting surfaces being interconnected through an electric circuit section comprising an electric resistor having variable resistance values depending on the particular destination of the carrier. Thus, for instance, if the resistance can assume ten different variable values inserted by actuating an indexing knob provided on the carrier, measuring the value of the resistance will permit of determining a particular destination among ten possible destinations; alternatively, if three conducting surfaces are used, measuring two variable resistances between one of these so-called reference surfaces and the other two will provide the clue for determining anyone of the hundred combinations given by two ten-value resistances, i.e., among hundred destinations or stations. Similarly, the use of four surfaces, still in the case contemplated hereinabove of ten resistance values for each circuit section, will permit of determining 1,000 destinations in a system comprising up to 1,000 stations.

The variable resistance may be measured through the equilibrium, at each station, of a Wheatstone bridge of which one branch consists of the variable resistance of the carrier associated with a properly selected resistance in order to balance the bridge when a carrier travels past same, provided that the carrier destination corresponds to this bridge. Testing the bridge equilibrium when a carrier moves past same will thus actuate suitable means controlling the desired path of this carrier.

BRIEF DESCRIPTION OF THE DRAWING

FIG. 1 is a side elevational view showing a carrier or cartridge for pneumatic dispatch system utilizing rectangular-sectioned pneumatic tubes;

FIG. 2 is a front view of the carrier;

FIG. 3 is a wiring diagram illustrating the mode of operation of the path control system when the carrier travels past a Wheatstone bridge corresponding to the intended carrier destination;

FIG. 4 is a side elevational view of a carrier or cartridge for pneumatic dispatch system utilizing circular-sectioned pneumatic tubes, showing a different arrangement of the lateral conducting surfaces, and FIG. 5 is an isometric view of a carrier having conducting surfaces adapted to be read in two different directions of travel.

DESCRIPTION OF THE PREFERRED EMBODIMENTS

In the example illustrated in FIGS. 1 and 2 of the drawing the body 1 of the carrier or cartridge carries longitudinal conducting strips assumed herein to be only two in number in order to simplify the disclosure, it being clearly understood however that a somewhat greater number of such strips may be provided in actual practice. The conducting strips 2, 3 are interconnected through resistors R1 to R10 (FIG. 3) adapted to be switched on by actuating a ten-position switch 4 secured to the head 5 of the carrier. Preferably, said resistors R1 to R10 have different stepped values such that the carrier will balance a Wheatstone bridge corresponding to its destination when the conducting strips 2, 3 engage the brushes 6, 7 electrically connected to the apices 8, 9 of said Wheatstone bridge of which the measuring circuit is connected to said apices 8, 10, the other apices 9, 11 being connected to a supply circuit 12. The resistances of the four branches of the bridge are so selected that the bridge is in a state of equilibrium between its apices 8, 10 only if the carrier resistance corresponds to the destination controlled by this bridge. This bridge equilibrium will then control an amplifier 13 connected to the supply circuit and adapted to actuate a power member 14 controlling in turn the carrier path or travel corresponding to this detector bridge.

In the example illustrated in FIG. 4 and utilizing circular-sectioned carriers or cartridges, the body 15 of each carrier comprises two conducting rings 16, 17 acting exactly like the strips 2, 3 of the preceding form of embodiment, by engaging, when travelling past each detecting bridge, contact brushes similar to the brushes 6, 7 but arranged of course with a view to correspond to the relative positions of rings 16 and 17. A variable resistor is inserted between these rings under the control of a switch similar to the switch 4 of the preceding form of embodiment, which is secured to the head 18 of the carrier body 15.

The simplified arrangement described hereinabove is sufficient for selecting 10 destinations or addressee stations, by using only two lateral conducting surfaces, since it is assumed that each carrier has 10 different resistance values corresponding each to a specific destination. Of course, this number (10) is given by way of example only and may be increased, but in actual practice it cannot be increased to considerable figures and on the other hand it is not possible, for a great number of stations, to provide a number of different resistances equal to the number of stations. To improve the selection capacity, a convenient solution consists in utilizing three conducting surfaces instead of two, and two switches, for example two ten-position switches, capable of putting in different resistors between one of the three conducting surfaces, then acting as a reference surface and each one of the other two resistors, so as to provide two circuit sections adapted to be inserted either simultaneously or successively in two Wheatstone bridges similar to the one depicted hereinabove, so that 100 different destinations can be selected. With four conducting strips and three ten-position step switches, and by using the same technique, it would be possible to select anyone of 1,000 different destinations or addressee stations.

Under these conditions, it will be seen that the number of conducting surfaces to be detected may be relatively small for delivering carriers to a relatively great number of receiving stations, so that these surfaces may be comparatively large to ensure a definitely reliable reading. It may also be noted that the use of different resistances for differentiating the various destinations from one another permits of rendering the control means insensitive to stray fields by utilizing detection circuits operating at relatively high voltages and resistance values, through which direct currents of very low intensity or density are caused to flow.

The use of elongated surfaces disposed in the direction of movement, notably as illustrated in FIG. 1, provides a sufficient pickup or reading time as the carrier travels past a detector device incorporated in the conveyor line, even at very high linear speeds of said carrier.

In certain cases, conducting surfaces or strips having different orientations and adapted to operate in different conveyors may be provided, for example in successive conveyor lines through or along which the carrier may be used to travel. A typical example of this arrangement is illustrated diagrammatically in FIG. 5 showing a lateral face of a carrier or container comprising two sets of conducting surfaces for automatically reading the destination in two different conveyors. The conducting surfaces comprise two strips 19, 20 parallel to one direction of travel and two other strips 21, 22 parallel to another direction, for example perpendicular to the one direction, and under these conditions it is clear that the strips 19, 20 may be utilized in one conveyor for directing the carrier in the direction of the arrow 23, the other strips 21, 22 being utilized in another conveyor for directing the carrier in the direction of the arrow 24.

The specific forms of embodiment described, shown and suggested herein with reference or not to the attached drawing should not be construed as limiting the scope of the invention since various modifications may be brought thereto without departing from the basic principles of the invention as set forth in the appended claims.

Finally, as already mentioned in the foregoing, this invention is also applicable to carriers and containers of all types, the shapes and relative dimensions shown in the drawing being given only by way of illustration.

What I claim is:

1. Self-steering carrier for conveyor systems of the type of pneumatic tube dispatch systems and the like, comprising a carrier body, at least two lateral conducting strips carried by said carrier body, a plurality of resistors of different values each connected by one end to one of said conducting strips, at least one selecting switch adapted to connect selectively the other end of said resistors to the other conducting strip, a Wheatstone bridge, a conveyor system for said carrier, contact elements of said conveyor system adapted to co-act with said conducting strips and connected to two successive apices of said Wheatstone bridge, said Wheatstone bridge being such to be in a state of equilibrium for the predetermined value of one said resistors corresponding to the destination controlled by said bridge, and means associated with said Wheatstone bridge to control, when said bridge is in a state of equilibrium, said carrier travel in said conveyor system.

2. Self-steering carrier as set forth in claim 1, wherein said lateral conducting strips are oriented in the direction of travel of said carrier.

3. Self-steering carrier as set forth in claim 2, wherein said lateral conducting strips are constituted by conducting rings disposed transversally in relation with the direction of travel of said carrier.

4. Self-steering carrier as set forth in claim 1, wherein each of said lateral conducting strips is oriented in different directions.

* * * * *